United States Patent [19]

Kitamura et al.

[11] 4,416,006

[45] Nov. 15, 1983

[54] RECORD DISC PLAYING APPARATUS HAVING THE FUNCTION FOR CORRECTING ROTATIONAL IRREGULARITIES DUE TO RECORD DISC ECCENTRICITY

[76] Inventors: Masatsugu Kitamura, 1046-15, Tomuro, Atsugi-City, Kanagawa-Ken; Hideo Onoe, Dorumi Tsuruma 708, 2-11-28 Nishitsuruma, Yamato-City, Kanagawa-Ken; Fumiaki Ohno, 2-10-502 Zengyoh-Danchi, 3768-3, Fujisawa, Fujisawa-City, Kanagawa-Ken; Tsuyoshi Ono, 2-14-12, Nishitsuruma, Yamato-City, Kanagawa-Ken; Yukihiro Kishima, 4097-18, Kaminagaya-Cho, Konan-Ku; Yutaka Morita, No.413, Sakuragaoka, Hodogaya-Ku, both of Yokohama-City, Kanagawa-ken, all of Japan

[21] Appl. No.: 403,022

[22] Filed: Jul. 29, 1982

Related U.S. Application Data

[63] Continuation of Ser. No. 170,972, Jul. 18, 1980, abandoned.

[30] Foreign Application Priority Data

Jul. 21, 1979 [JP] Japan ................................. 54-92989

[51] Int. Cl.³ ...................... G11B 17/00; G11B 19/24
[52] U.S. Cl. .................................. 369/240; 369/239; 369/267
[58] Field of Search ............... 369/239, 241, 267, 240

[56] References Cited

U.S. PATENT DOCUMENTS

| 3,689,079 | 9/1972 | Matsuda et al. | 369/33 |
| 3,937,476 | 2/1976 | Sakai | 369/239 |
| 4,123,779 | 10/1978 | Goldschmidt | 369/241 |
| 4,138,121 | 2/1979 | Nakajima et al. | 369/242 |
| 4,184,688 | 1/1980 | Omura et al. | 369/230 |

*Primary Examiner*—Steven L. Stephan
*Attorney, Agent, or Firm*—Anthony H. Handal

[57] ABSTRACT

A record disc playing apparatus comprises an address signal generating unit for generating address signals corresponding to horizontal rotational angular positions of a tone arm, a device for generating a rotational angular velocity signal corresponding to the rotational angular velocity of the tone arm, a circuit for controlling the rotation of a motor for driving a turntable, a control device supplied with the address signals and having a memory device from which is from which read out information corresponding to the addresses indicated by the address signals, and an attenuation circuit supplied with the rotational angular velocity signal and operating with an attenuation quantity, with respect to the rotational angular velocity signal, which quantity is varied by a signal from the control device. The rotational angular velocity signal corresponds to the quantity of any eccentricity of the record disc. The control device producing as output signals based on the information thus read out. The attenuation circuit supplying an output signal to the control device. The rotation of the motor is so controlled that a rotational irregularity due to any eccentricity of the record disc is corrected for.

6 Claims, 17 Drawing Figures

RECORD DISC PLAYING APPARATUS HAVING THE FUNCTION FOR CORRECTING ROTATIONAL IRREGULARITIES DUE TO RECORD DISC ECCENTRICITY

This application is a continuation of application Ser. No. 170,972, filed July 18, 1980, now abandoned.

BACKGROUND OF THE INVENTION

The present invention relates generally to record disc playing apparatus having the function for correcting rotational irregularities due to record disc eccentricity. More particularly, the invention relates to a record disc playing apparatus which corrects rotational irregularities due to record disc eccentricity and is capable of reproducing and playing a record disc in an excellent manner in a state without irregularities at any portion of the record disc from its outer periphery to its innermost recorded part.

In general, at the time of molding record discs, it is difficult to provide all record discs with central holes that are exactly coincident with the center of rotation, and these central holes all have some kind of offset from the true rotational center, that is, have eccentricities.

When a record disc with such an eccentricity is placed on a turntable rotating at a constant rotational angular velocity and is played by a reproducing stylus caused to trace along the record sound groove, the relative linear velocity between the stylus and the second groove varies as a result of the rotational irregularity caused by the eccentricity, whereby wow is generated in the reproduced signal. The quantity of this wow in the reproduced signal varies in inverse proportion to the distance from the rotational center of the record disc to the portion of the tip of the reproducing stylus.

SUMMARY OF THE INVENTION

Accordingly, it is a general object of the present invention to provide a novel and useful record disc playing apparatus for controlling the rotational speed of the turntable and to substantially correct rotational irregularities due to eccentricity of the record disc.

Another object of the invention is to provide a record disc playing apparatus provided with means for generating an address signal corresponding to the rotational angle of the tone arm, means for generating a signal proportional to the rotational angular velocity of the tone arm, and means for obtaining a signal for controlling the rotation of the turntable in accordance with a signal indicative of the quantity of eccentricity obtained on the basis of the rotational angular velocity signal and the above mentioned address signal. In the apparatus of the present invention, even when there is an eccentricity in a record disc, a reproduced signal in which there is no influence of rotational irregularities due to the eccentricity, and wow is not generated, can be obtained from the outer periphery to the innermost record part of the record disc.

Other objects and further features of the invention will be apparent from the following detailed description when read in conjunction with the accompanying drawings.

DETAILED DESCRIPTION

Figure 1:
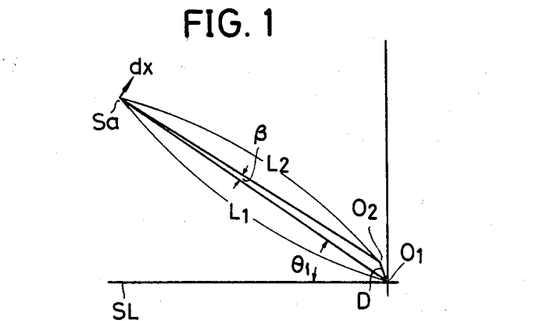
FIG. 1 is a diagram for explaining the relationship between an eccentricity of a record disc and position of a reproducing stylus.

First, with reference to FIG. 1, the variation in the circumferential speed at the stylus tip position of the reproducing stylus on the a record disc having eccentricity will be described. The case wherein the record disc has eccentricity, and the center O2 of the record disc relative to the center O1 of the turntable is as shown in FIG. 1 will be considered. The distance between the position Sa of the tip of the reproducing stylus and the turntable center O1 will be denoted by L1, and the distance from this position Sa to the record disc center O2 will be denoted by L2. The angle between the line $\overline{O1Sa}$ joining the center O1 and the position Sa and the reference line SL will be denoted by $\theta 1$, and the angle between the line $\overline{O1Sa}$ and the line $\overline{O2Sa}$ joining the center O2 and the position Sa will be denoted by $\beta$. The distance between the centers O1 and O2, that is, the quantity of the eccentricity will be denoted by D.

Then, in accordance with the rotation $d\theta 1$ of the turntable, the quantity of displacement (distance) dX1 of a point Sa at the distance L1 from the turntable center O1 on the turntable can be expressed as follows.

$$dX1 = L1 d\theta 1$$

Accordingly, the distance dX through which the tip of the reproducing stylus undergoes displacement along the sound groove of the disc as a consequence of the rotation $d\theta 1$ of the turntable is expressed by the following Equation (1).

$$dX = \frac{dX_1}{\cos\beta} = \frac{L_2(\sqrt{L_2{}^2 D^2 \sin^2\theta 1}) + D\cos\theta 1}{\sqrt{L_2{}^2 D^2 \sin^2\theta 1}} d\theta 1 \quad (1)$$

The relation between the quantity of eccentricity D and the distance $L_2$ is expressed by $$D < L_2 \quad (2)$$

Accordingly, the above Eq. (1) can be expressed as an approximation from the relation of Eq. (2) as follows.

$$dX \approx L_2\left(1 + \frac{D}{L_2}\cos\theta 1\right) d\theta 1 \quad (3)$$

By differentiating Eq. (3) with respect to time t to determine the linear velocity dX/dt of tracing of the reproducing stylus relative to the sound groove of the disc, the following Eq. (4) is obtained.

$$\frac{dX}{dt} = \frac{dX}{d\theta 1} \cdot \frac{d\theta 1}{dt} = \quad (4)$$

$$L_2\omega_1\left(1 + \frac{D}{L_2}\cos\theta 1\right) = \frac{dX1}{dt} \cdot \frac{1}{\cos\beta}$$

where $\omega_1 = d\theta 1/dt$.

Since the angle $\beta$ is ordinarily very small, $\cos\beta$ may be considered to be substantially one (unity), that is, $\cos\beta = 1$. Therefore, as a consequence of the eccentricity, the tracing linear velocity dX/dt of the reproducing stylus tip varies in the form of a sinusoidal wave with an amplitude of $D/L_2$. Here, the tracing linear velocity means the tracing linear velocity of the stylus tip at the time when the stylus traces the sound groove in a state wherein a signal is not recorded therein.

When, during one revolution of the turntable, the centers O1 and O2 and the posisiton Sa assume a state wherein they are alined in a single line in this order, the tone arm is swung to its most outward angle, and the linear velocity of the reproducing stylus tip in tracing the sound groove at this time becomes the maximum value $L_2\omega_1(1+D/L_2)$. On the other hand, when the centers O2 and O1 and the position Sa assume a state of alinement in a single line in this order, the tone arm is swung to the innermost angle, and the tracing linear velocity of the stylus tip relative to the sound groove at this time becomes the minimum value $L_2\omega_1(1-D/L_2)$. Between the above mentioned maximum and minimum values, the sound groove tracing linear velocity varies as a sinusoidal curve in accordance with the rotational angle of the turntable.

Accordingly, in accordance with the present invention, the rotational speed of the turntable is caused to vary in accordance with $1/(1+(D/L_2)\cos\theta 1)$, and, at the same time, phases are so matched that the variation of the rotational speed of the turntable will become lowest (or highest) when the tone arm is at its outermost (or innermost), angular position. Furthermore, the value of the amplitude $L_2/D$ is obtained from the quantity 2D of swing of the tone arm and the value of the distance $L_2$ determined in correspondence with the address of the tip portion of the reproducing stylus, and, in accordance with this value of the amplitude $L_2/D$, a signal for correcting for the eccentricity is supplied to a servo circuit for controlling the rotational speed of the turntable.

Figure 2:
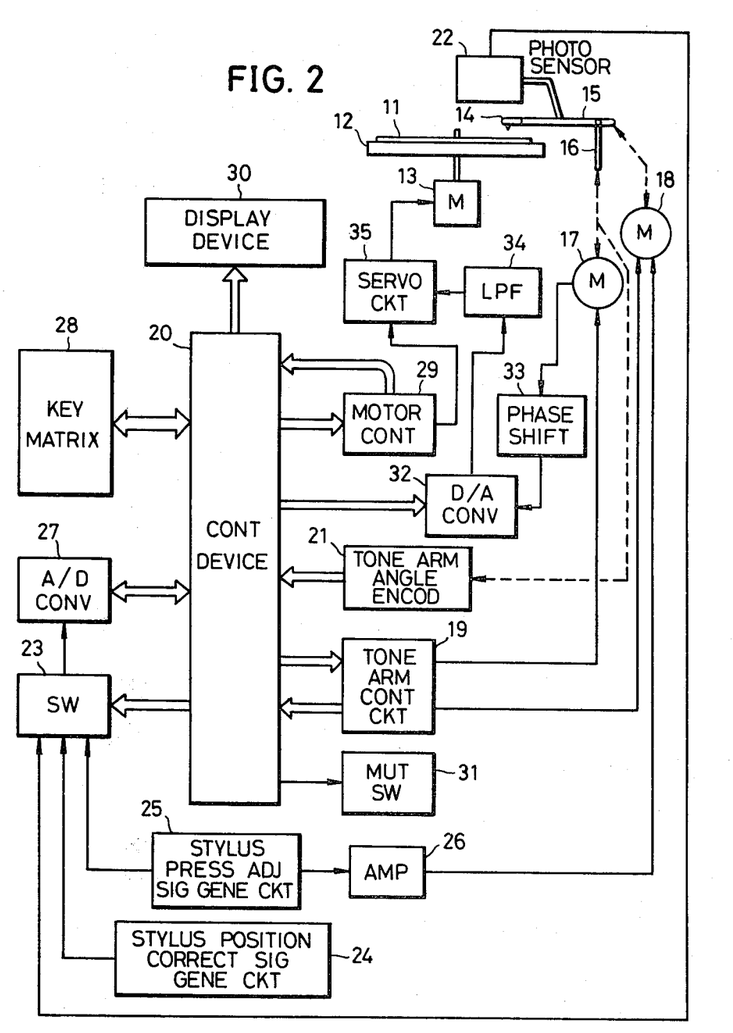
FIG. 2 is a block diagram of one embodiment of a record disc playing apparatus having the automatic inside force cancelling function according to the present invention.

The general block system of one embodiment of the record disc playing apparatus of the invention of an organization capable of correcting eccentricity of the record disc on the basis of the above described principle will now be described in conjunction with FIG. 2. A record disc 11 is placed on a turntable 12 driven by a motor 13 and is rotated at a specific rotational speed. In a position suitable for its operation with respect to the record disc 11, a tone arm 15 provided at its distal outer end with a pickup cartridge 14 is pivotally supported in a manner permitting it to swing freely horizontally and vertically on shaft 16.

Upon automatic playing, a horizontal driving force is imparted in the horizontal swinging direction to this tone arm 15 by the operation of a horizontal drive motor 17. Furthermore, a force is imparted in the vertical rotational direction to the tone arm 15 by the operation of a vertical drive motor 18. The motors 17 and 18 are driven by output drive signals of a tone arm control circuit 19. The operation of this control circuit 19 is controlled by a control device 20. At the same time, this control circuit 19 supplies information relating to the state of the tone arm 15 to the control device 20.

The horizontal drive motor 17 includes a device for generating a rotational angular velocity signal in proportion to rotational angular velocity of the tone arm 15. The produced rotational angular velocity signal is supplied to a phase shifter 33.

As the pickup cartridge 14 traces the sound groove of the record disc 11 and the tone arm 15 swings horizontally, a tone arm angle encoder 21 of a construction as described hereinafter generates an address signal corresponding to the horizontal rotational angle of the tone arm 15. This output address signal of the encoder 21 is supplied to the above mentioned control device 20.

A photosensor 22 of a construction as described hereinafter is adapted to rotate unitarily with the tone arm 15 and produces a detection signal, as described hereinafter, which is applied to a changeover switch 23. A circuit 24 for generating signals for correcting the position of the stylus of the pickup cartridge 14 and a circuit 25 for generating signals for adjusting the stylus pressure, which respectively comprise, for example, variable resistors connected to a voltage source of constant voltage, are provided. From the sliding contacts of these circuits 24 and 25, a stylus position correcting signal and a stylus pressure adjusting signal are respectively led out and applied to the changeover switch 23. Furthermore, the stylus pressure adjusting signal from the signal generating circuit 25 is also applied by way of an amplifier 26 to the vertical drive motor 18. The changeover state of the changeover switch 23 is controlled by a signal from the control device 20, and, in response to this control signal, the changeover switch 23 operates to selectively change over the signals applied from the photosensor 22 and the signal generating circuits 24 and 25 and to supply the signals thus switched to an analog-to-digital (A/D) converter 27. The resulting output of the A/D converter 27 is fed to the control device 20.

This control device 20 comprises a microprocessor, random-access memory (RAM), read-only memory (ROM), and other components. The control device 20 is supplied with an information signals based on, for example, playing start, completion, programmed music piece numbers, and other information signals fed as input from a key matrix 28, an information signal relating to the state of the tone arm 15 from the tone arm control circuit 19, an address information signal from the encoder 21, an information signal relating to the rotational angle of the turntable 12 from a motor control circuit 29, and an information signal from the A/D converter 27.

The output of the control device 20 is fed also to a display device 30, a muting switch 31, and a digital-to-analog (D/A) converter 32. The output of the D/A converter 32 is applied by way of a low-pass filter 34 to a servo circuit 35 for the motor 13.

Figure 3:
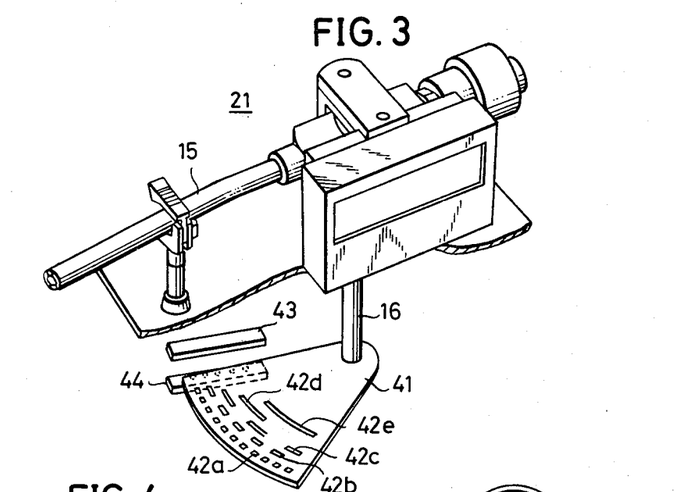
FIG. 3 is a perspective view, with parts cut away, of one embodiment of a tone arm angle encoder in the apparatus shown in FIG. 2.

The construction of one embodiment of the aforementioned tone arm angle encoder 21 will now be described in conjunction with FIG. 3. A code plate 41 is horizontally fixed to the shaft 16 of the tone arm 15. This code plate 41 is provided therethrough which arcuate rows of through holes 42a through 42e of pattern arrangements according to respectively different codes, these rows being along respective arcs of circles of respectively different radii from the axis of the shaft 16 taken as a center. Above and below the code plate 41, there are respectively provided a row 43 of light source elements and a row 44 of photoelectric conversion elements respectively confronting the light source elements with the code plate 41 interposed therebetween. These rows 43 and 44 extend in the radial direction from the axis of the shaft 16 taken as a center, and the respectively confronting light source elements and photoconductive elements are disposed to register with the above described arcuate rows of through holes in the code plate 41.

The codes of the presence or absence of the through holes in the code plate 41 in register with the photoconductive elements of the row 44 differ with the angular position of the code plate 41. Accordingly, photoconductive elements coinciding with the code in the radial direction of the aligned through holes receive light from their corresponding light source elements. The resulting output signal of the photo electric conversion element row 44 is level selected by a level detection circuit (not shown) and rendered into a code signal, which is fed into the control device 20. This code signal corresponds the angular position of the tone arm 15 and is an address signal indicative of the angular position of the tone arm.

As a modification of the above described embodiment of the invention, an encoder in which the code plate 41 is fixed, and the row 43 of light sources and the row 44 of photoconductive elements rotate horizontally together with the shaft 16 may be used.

Figure 4:
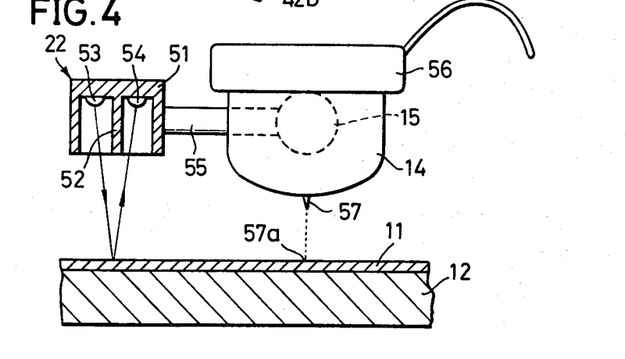
FIG. 4 is an elevation, with parts in vertical section, showing an example of a photosensor in the apparatus shown in FIG. 2.

As shown in FIG. 4, the aforementioned photosensor 22 has a case 51 which is open at its bottom and has a partition wall 52 separating the interior of the case into two chambers respectively accommodating a light source 53 and a light-receiving element 54. The case 51 is fixedly supported by a connecting beam 55 fixed to the tone arm 15. For this reason, the relative positional relationship between the tone arm 15 and the photosensor 22 remains unchanged even when the head shell 56 in which the cartridge 14 with the reproducing stylus 57 is mounted is disconnected from the tone arm 15 and exchanged with a head shell of another type. Therefore, the homologous relationship between the address of the position of the photosensor 22 and the output address signal of the above described encoder 21 is always constant irrespective of the exchanging of the head shell.

Then the address of the position 57a of the reproducing stylus 57 on the record disc 11, which address changes with the exchanging of the head shell, can be readily corrected with the address of the photosensor 22 as a reference datum. For this correction, it is necessary that, within the range of horizontal rotation of the tone arm 15, the difference between the addresses in the diametral direction of the turntable 12 corresponding respectively to the horizontal rotational position of the tip of the stylus 57 and the horizontal rotational position of the photosensor 22 be substantially constant. For this reason, the photosensor is so positioned that it traces a path coinciding substantially with the rotational path of the stylus 57 and, moreover, at the time of plyaing of the record disc, advances ahead of the stylus in the rotational direction of the tone arm 15. The above mentioned correction is performed by that stylus position correcting signal generating circuit 24 is adjusted, thereby adjusting the address of the position 57a stored within the control device 20.

Figure 5:
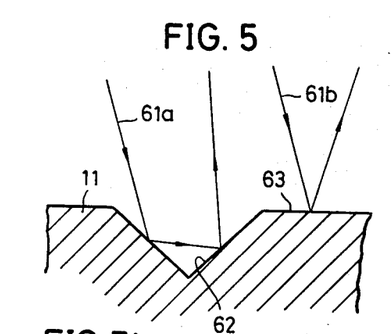
FIG. 5 is an enlarged fragmentary view, in section, for a description of the state of reflection at the surface of a record disc of light from a light source of the photosensor.

The light from the light source 53 of the photosensor 22 is projected onto and reflected from the surface of the record disc 11, and the reflected light is received by the light receiving element 54. The state of the reflection of the light from the light source 53 at the surface of the record disc 11 is indicated in FIG. 4. In the case where an incident light 61a is projected onto walls of a groove 62 in the record disc 11, the light reflected by the walls of the grooves 62 is directed toward the light-receiving element 54. Accordingly, when the incident light is being projected onto a part where there are many sound grooves 62, only a small quantity of reflected light reaches the light receiving element 54. On the other hand, in the case where an incident light 61b is projected onto a portion of many plane parts 63 such as a soundless groove between sound groove bands, and lead-in and left-out groove parts, the greater portion of the light reflected at the plane part 63 of this character is directed toward the light-receiving element 54. In the present example, the diameter of the light spot is, for example, of the order or 2 to 3 mm.

Figure 6:
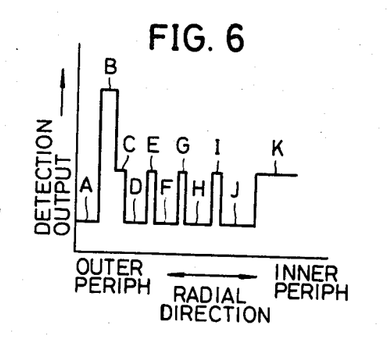
FIG. 6 is a graph indicating the variation of the output of light reception detection which occurs when the photosensor is moved over the record disc in a radial direction thereof.

Accordingly, the light detection output of the light receiving element 54 at the time when the tone arm 15 is caused to swing horizontally from its rest position outside of the turntable 12 to the innermost recording position of the record disc becomes as indicated in FIG. 6. In the graph of FIG. 6, the ordinate represents detection output, while the abscissa represents positions in the radial direction of the record disc, the outer periphery of the record disc being toward the left and the center of the record disc being toward the right. In this graph, the ordinate indicates the detection output of the light receiving element 54 when the light from the light source 53 is projected onto various parts, namely, the motor board surface as indicated at portion A, the turntable surface as indicated at portion B, the unrecorded parts between recorded parts on the record disc as indicated at portion B, the unrecorded parts between recorded parts on the record disc as indicated at portions C, E, G, and I, and recorded parts on the record disc as indicated at portions D, F, H, and J.

Because, in this manner, the light reflection factor of the turntable and that of the lead-in portion of the periphery of the record disc 11 are different, the lead-in portion of the record disc 11 can be positively detected. Therefore, the diametric size of the record disc can be automatically discriminated at the time of automatic playing of the record discs as described hereinafter, and the reproducing stylus is automatically and positively lowered into the lead-in groove of the record disc.

The detection output of the analog signal of the photosensor 22 is supplied via the switch 23 to the A/D converter 27 to be converted into a digital signal, which is then fed into the control device 20.

The motor control circuit 29 generates a driving voltage in response to a control signal from the control device 20 and applies this voltage to the servo circuit 35. From the motor control circuit 29, and information relating to the angular position of the turntable 12 is supplied as an information signal for correcting the address in the diametric direction of the record disc, which varies with the eccentricity, to the control device 20.

When the tone arm 15 is lowered, and the stylus 57 contacts the record disc 11, noise is generated. The muting switch 31 has the function of muting to prevent this noise from occurring in the reproduced sound and is controlled by a signal from the control device 20.

Figure 7A:
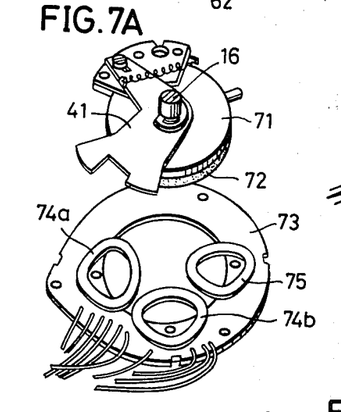
FIGS. 7A and 7B are respectively an exploded perspective view and a plan view showing one example of a horizontal drive motor according to the invention in the apparatus shown in FIG. 2.
Figure 7B:
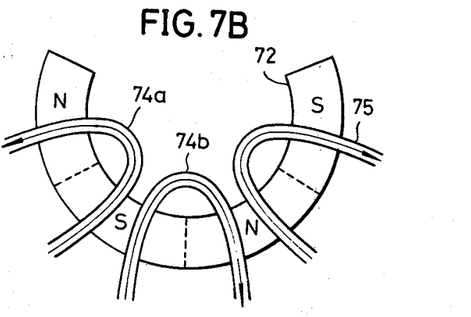

An exploded perspective view of the essential parts of one example of the horizontal drive motor 17 according to the invention is shown in FIG. 7A. A yoke 71 and a permanent magnet 72 of arcuate shape are fixed to the shaft 16 to rotate unitarily therewith. At positions to confront the magnet 72, horizontal drive coils 74a and 74b and a horizontal speed detection coil 75 of flat ring shape are fixedly mounted to lie in a single horizontal plane on a horizontal holding ring 73. The magnet 72 has been magnetized to have magnetic poles N and S in alternate disposition as shown in FIG. 7B.

For rotating the tone arm 15 at the start and the completion of automatic playing of a record disc, a driving current is passed from the control circuit 19 respectively in a specific direction and the reverse direction through the drive coils 74a and 74b. As a result of the magnetic field formed by the driving coils 74a and 74b, a torque is imparted to the magnet 72, whereby the tone arm 15 is swung from the arm rest position to the lead-in position and, when the driving current direction is reversed, from the lead-out position to the arm rest position. On the other hand, during record playing, the rotational angular velocity of the tone arm swinging due to eccentricity of the record disc is detected by a velocity detecting coil 75, whereby a rotational angular velocity signal is produced and supplied to the phase shifter 33, while the vertical drive motor 18 not illustrated or described in detail, it has a construction similar to the horizontal drive motor 17 and comprises, essentially, a yoke, an arcuate permanent magnet mounted on the yoke, and flat vertical drive coils and a vertical speed detection coil supported to lie in one vertical plane.

The rotational angular velocity signal detected by the horizontal drive motor 17 and supplied to the phase shifter 33 is proportional to the quantity of left and right swing (D+D=2D) of the tone arm 15 and, at the same time, is proportional to the rotational speed of the turntable 12. Furthermore, in the case where the above mentioned detector is of the electromagnetic type, the phase of the signal is retarded or lagged by 90 degrees relative to the phase of the spatial swinging of the tone arm 15.

Figure 8:
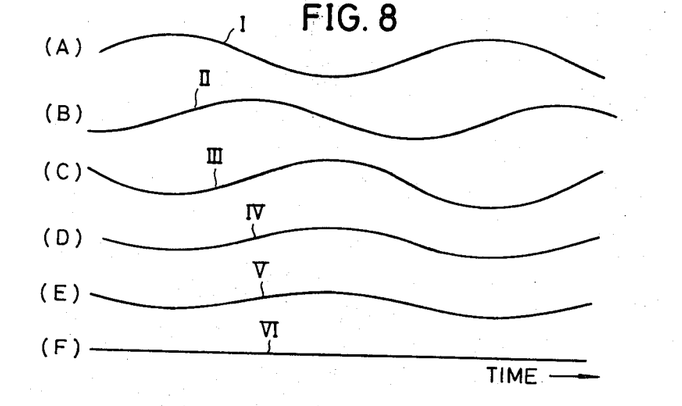
FIG. 8(A) through FIG. 8(F) are graphs respectively showing relative tracing linear velocity of the reproducing stylus to the sound groove of the record disc having eccentricity and wave form of rotational angular velocity signal.

In FIG. 8, the curve I indicates the variation with time of the tracing linear velocity of the recording stylus tip conforming to the eccentricity of the record disc, while the curve II indicates the variation with time of the detected rotational angular velocity signal.

The rotational angular velocity signal of curve II supplied to the phase shifter 33 is phase lagged by 90 degrees thereby and rendered into a signal as indicated by curve III, which is fed into the D/A converter 32. It is to be noted that the signal of curve III is of substantially opposite phase relative to that of the curve I. The output signal of the phase shifter 33 has a magnitude proportional to both the rotational speed of the turntable 12 and the quantity of eccentricity D of the record disc 11. Also, this output signal is of the form of a sinusoidal wave of constant amplitude value, determined in correspondence with the quantity of eccentricity possessed by the record disc, when considered with respect to one revolution at any part of the record disc in the region from the outer periphery to the innermost recording part thereof. Therefore, this signal can be used as a signal representative of the eccentricity quantity of the record disc.

On one hand, the address value indicated by the address signal produced as output from the encoder 21 is the address value of the position of the reproducing stylus tip, and, from this address value, the distance $L_1$ between the center O1 of the turntable 12 and the stylus tip position Sa can be readily determined. This distance $L_1$ is undergoing a periodic variation between $(L_2+D)$ and $(L_2-D)$ in every revolution of the turntable as a consequence of the eccentricity of the record disc. This variation can be indicated by the corresponding address value.

The eccentricity quantity D is extremely less than the distance $L_2$, that is, $D \leq L_2/100$. For this reason, the value $L_1$ may be used instead of the value $L_2$, which is considered to be necessary for causing variation of the signal representing the eccentricity quantity, without adverse result. The control device 20 operates in response to the address signal indicative of the stylus tip position, which has been introduced as input thereinto from the encoder 21, to form a signal to be fed into the D/A converter 32. The D/A converter 32 operates in response to this signal from the control device 20 to render the signal representing the eccentricity quantity D from the phase shifter 33 into an attenuationally varied signal in accordance with the address position and the distance $L_1$.

Figures 9, 10:
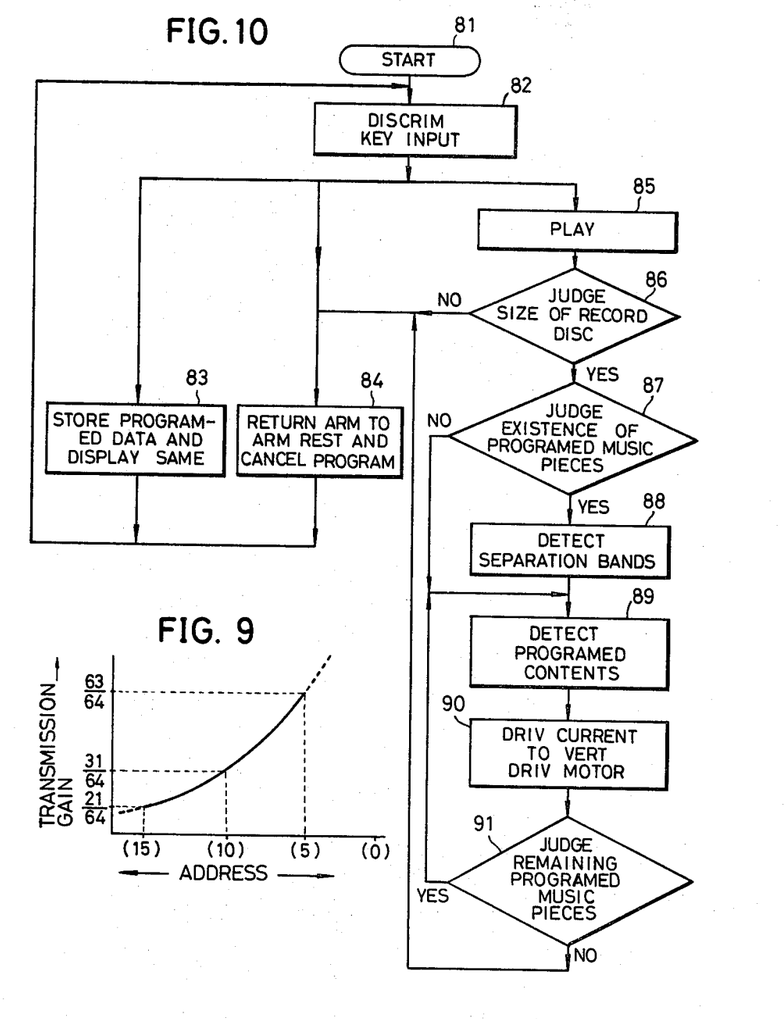
FIG. 9 is graph showing a characteristic of transmission gain of a D/A converter for address position.
FIG. 10 is a flow chart for a description of the operation of the apparatus illustrated in FIG. 2.

FIG. 9 illustrates one example of the relationship between address value and control value in the case where an addition type D/A converter of 6 bits is used as the D/A converter 32. In this graph, the abscissa represents the address of the reproducing stylus tip (the numerals in the parentheses indicating distance (cm) from the center of the record disc), while the ordinate represents the transmission gain of the D/A converter. In the example illustrated in FIG. 9, with respect to the addresses in the portion from the sound groove position at the outermost peripheral part of a record disc of 30 cm. diameter to the sound groove position at the innermost recording part of 17 cm. diameter of the record disc, the transmission gain of the D/A converter varies in the form of a hyperbolic curve. That is, the transmission gain is substantially inversely proportional to the address position.

The control device 20 has a memory device (ROM) having a table of values along the hyperbolic curve with respect to the addresses from the address of the sound groove position at the outermost peripheral part of a 30 cm. diameter record disc to the sound groove position at the innermost recording part of 17 cm. diameter of the record disc. The control device 20 reads out from its ROM a value corresponding to an address value indicated by an address signal imparted from the encoder 21 and feeds this value to the D/A converter 32.

The D/A converter 32 performs the operation of an attenuator. A signal as indicated by curve IV in FIG. 8 is sent out at every constant time interval from the D/A converter 32 and is supplied to the low-pass fileter 34 to be smoothed thereby. The resulting output signal of the low-pass filter 34 is supplied to the servo circuit 35. The rotational speed of the motor 13 whose rotation is controlled by the servo circuit 35 varies as indicated by curve V in FIG. 8. The curve III in FIG. 8 is of substantially opposite phase relative to the curve I, whereby the curve V is of substantially opposite phase relative to the curve I. Accordingly, the tracing linear speed of the reproducing stylus relative to the record disc sound groove is constant as indicated by the straight line VI in FIG. 8. Therefore, even if there is an eccentricity in the record disc, the tracing linear velocity of the reproducing stylus will be constant, and no wow due to the eccentricity will be generated in the reproduced signal.

It is to be understood that the phases are so relatively set that, with the tone arm 15 in its state wherein it has swung to its outermost position near the outer periphery of the record disc as a result of the eccentricity of the disc, the rotational speed of the turntable 12 will be minimum of $1/(1+D/L_2)$. By this phase setting, the rotational speed of the turntable 12 is varied in accordance with the relationship $1/(1+(D/L_2) \cos \theta_1)$ with respect to the address indicated by the address signal generated by the encoder 21.

As mentioned hereinbefore, the value $L_1$ may be used instead of the value $L_2$ without adverse result, from which the supplying of a signal from the control device 20 to the D/A converter 32 can be carried out without consideration of the rotational phase of the turntable 12.

However, in the case where the supplying of a signal from the control device 20 to the D/A converter 32 is caused to be carried out only at the time of a specific rotational phase (rotational angle) of the turntable 12, the control device applies to the D/A converter 32, only a signal (which may be considered to be a signal corresponding to the value of $L_2$) corresponding to the address of the reproducing stylus at the time of a specific rotational phase of every rotation of the turntable even when, as a result of the eccentricity, the tone arm 15 is being swung over an extent of 2D for every revolution of the turntable. Accordingly, in this case, signals of respectively different values corresponding to variation in the address value over a width of 2D of the eccentricity occurring every revolution of the turntable 12 are not applied to the D/A converter 32. For this reason, the tone arm 15 is moved smoothly from the outer periphery to the inner part of the record disc.

By obtaining the average value of the minimum value and the maximum value of the address value corresponding to the maximum value and the minimum value of the value of the distance $L_1$ varying during every revolution of the turntable 12, thereby forming a signal corresponding to the address value of this average value, and causing this signal to be supplied to the D/A converter 32, accurate and positive control by the servo circuit 35 can be readily carried out.

In this connection, it is to be noted that the magnitude of the output signal from the means for detecting the rotational angular velocity of the horizontal drive motor 17 is proportional respectively to the eccentricity quantity of the record disc and the rotational speed of the turntable. Accordingly, in the case where the rotational speed of the turntable is changed in accordance with the kind of the record disc, the control device 20 receives information relating to this speed change and sends to the D/A converter 32 a signal indicating the relationship of inverse proportion to the magnitude of the rotational angular velocity signal varying in correspondence with the variation of the rotation speed of the turntable.

The address signal from the encoder 21 and the detection signal from the photosensor 22 are stored in a memory device comprising the RAM within the control device 20. The control device 20 is capable of reading out the values of these two signals thus stored and of carrying out comparison operation. Then, prior to automatic playing of a record, position such as the lead-in position at the outer periphery of the record disc and the positions of unrecorded separation band between adjacent music pieces are determined as address positions in the radial direction of the turntable 12 and thus stored in the memory device. As a result of this preparation, at the time of automatic record playing, the reproducing stylus is lowered accurately in the unrecorded separation band between music pieces immediately before a desired music piece.

The address signal from the encoder 21 and the signal which has been sent out from the stylus position correcting signal generating circuit 24, and which has passed through the A/D converter 27, are subjected to subtraction within the control device 20, and an accurate address signal in the radial direction of the record disc 11 of the position of the tip of the reproducing stylus is obtained. Therefore, even when the pickup cartridge is replaced, and the tip position of the reproducing stylus changes, a signal corresponding to the correct address in the radial direction of the turntable of the stylus can always be obtained and used for various operations of automatic record playing.

Furthermore, by using the signal corresponding to the rotational angular position of the turntable 12, which signal has been obtained from the motor control circuit 29 and stored and the detection signal indicative of quantities such as the height of the tone arm 15 and the lowering speed thereof in the vertical direction, the relationship between the rotational angular position of the turntable prior to the descent of the tone arm and that at the time when the stylus contacts the record disc is obtained. Then, from the turntable angular position at any chosen time, the time instant at which the stylus will contact the record disc can be calculated. As a result, even if there is an eccentricity in the record disc, the reproducing stylus will always be lowered accurately at the lead-in position or the position of a band between recorded pieces of the record disc.

By variable adjusting the variable resistor of the stylus position correcting signal generating circuit 24, the address of the tip position of the reproducing stylus can be finely varied. Therefore, even when a variation in the position of the stylus tip is caused by an interchanging of the head shell, adjustment can be so carried out that the stylus will be lowered accurately into an unrecorded part of the sound groove between recorded music pieces. Furthermore, adjustments can be readily made to compensate for irregularities of lead-in addresses for record disc of various diametric sizes.

The operation of the apparatus of the present invention will be described in detail with reference to the block diagram of FIG. 2 and flow charts of FIGS. 10 and 11.

A step 81 indicates the START of the operational sequence of the control device 20, which may be microcomputer. Namely, when the power switch (not shown) of the apparatus is put into a stand-by state, the control device becomes operable, and then the operator or user of the apparatus manipulates a key of the key matrix 28 to enter necessary information, such as predetermined pieces of music to be played in a sequence. In a following step 82, the control device 20 reads the information or data from the key matrix 28, and detects what kind of commands have been given. In case that the command from the key matrix 28 is to program predetermined pieces of music, a following step 83 takes place to store the output signals of the key matrix 28 in the memory device (RAM) of the control device 20, in the selected order. Such information of pieces of music selected will be displayed at the display 30 so that the user can ascertain what have been selected.

In a case where the command from the key matrix 28 is to reject the tone arm of the record player, a step 84 takes place to return the pickup arm 1 to the arm rest and to cancel programed information if any. In this case, the control device 20 sends and receive the necessary signals to and from the tone arm control circuit 19.

In a case where the command from the key matrix 28 is to play, a step 85 takes place to lift the tone arm from the arm rest. In this case, the control device 20 sends and receives the necessary signals to and from the tone arm control circuit 19.

This tone arm control circuit 19 comprises a driving circuit which produces two driving currents respectively applied to the horizontal drive motor 17 and vertical drive motor 18, and a detecting circuit which detects the situation of the tone arm 15. In detail, the increase in each of driving currents is detected to see whether the tone arm 15 has reached a stopper which is arranged to abut against the tone arm when the tone arm is lifted vertically; to see whether the tone arm has reached a second stopper which is arranged to abut against the tone arm when the tone arm is horizontally rotated toward the center of the turntable excessively, and to see whether the stylus is placed on the surface of the record disc. The detected data are applied to the control device 20 so that the control circuit 19 with control signals by which the driving currents are controlled to lift, lower, horizontally rotate in both directions, support and stop the tone arm. This means that the tone arm 15 can be freely controlled in accordance with various commands applied from the key matrix 28. The driving current of the vertically driving motor 18 can be further controlled in accordance with the output signal of the amplifier 26 to adjust the stylus pressure, as will be described hereinafter, when the stylus is placed on the surface of the disc 11.

After the step 85, it is detected whether a disc 11 is on the turntable 12 in a step 86. In this step 86, not only the presence of a disc but also the size, i.e. the diameter, of the disc, such as 30, 25 or 17 cm, if a disc on the turntable 12 is detected, is detected. If the answer of this step 86 is NO, namely, if no disc is detected, the program sequence enters into the aforementioned step 84. On the other hand, if the presence of a disc is ascertained, a following step 87 takes place in which it is detected whether there are any programmed pieces of music. If the answer of this step 87 is YES, i.e. when at least one piece of music has been programmed to be played back, a following step 88 takes place to detect the unrecorded separation bands by the photo sensor 22. On the contrary, if the answer of this step 87 is NO, reads the address signal from the angle encoder 21. Namely, the horizontal angle of the tone arm 15 is detected. In a step 94, it is detected whether the arm angle is the maximum in the tone arm 15 is lifted and turned horizontally to the lead-in position of the outer peripheral part of the record disc in accordance with the size, i.e., the diameter of the disc detected in the step 86.

Figure 11:
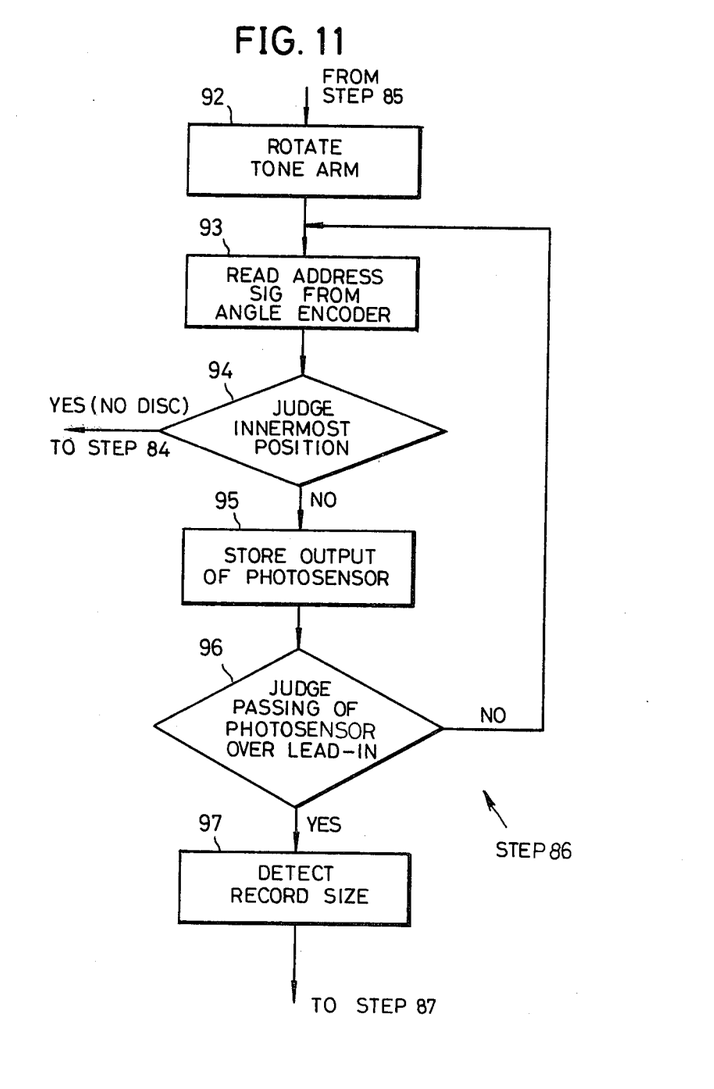
FIG. 11 is a flow chart indicating in detail the steps in one portion of the operation indicated in FIG. 10.

Detecting of the size of the record disc at the step 86 is performed by steps shown in the flow chart of FIG. 11. In a step 92, the tone arm 15 is upwardly rotated in a vertical plane by the vertical drive motor 18 until it contacts an upper limiting stopper, thereafter, the tone arm 15 is horizontally rotated by horizontal drive motor 17. In a following step 93, the control device 20 reads the address signal from the angle encoder 21. Namely, the horizontal angle of the tone arm 15 is detected. In a step 94, it is detected whether the arm angle is the maximum in the possible rotational angle of the same. Namely, it is detected whether the tone arm 15 is located in the innermost position with respect to the turntable 12. If the horizontal rotational angle of the tone arm 15 is the maximum, the answer of the step 94 is YES, namely, the tone arm 15 is located in the innermost position, no disc is on the turntable 12. In this case, the operation is returned to the step 84, playback cannot be performed and thus the tone arm 15 will be returned to the arm rest. When the answer of the step 94 is NO, namely, the tone arm 15 is not located in the innermost position, the operation proceeds to a step 95. At the step 95, the output signal of the photo sensor 22 is stored in a memory through the switching circuit 23 and the A/D converter 27. The output digital signal of the A/D converter 27 is stored in the memory device of the control device 20.

In the following step 96, the control device 20 compares the past maximum value stored at the step 95 and the present new value. When the comparison result becomes a predetermined value (for example, a value smaller than a half of the past maximum value), passed through the lead-in portion of the record disc. In this case the answer of the step 96 becomes YES and a following step 97 takes place to detect the size or diameter of the disc. Namely, when the answer of the step 96 is YES, the horizontal rotational angle of the tone arm 15, which is indicated by the arm angle encoder 21, is compared with prestored values indicative of different sizes of discs so that the size of the disc on the turntable is determined. If the answer of the step 96 is NO, the program sequence returns to the step 93. After the record disc size is detected in the step 97, the program enters into the step 87 of FIG. 10 as described hereinabove.

The horizontally rotating speed of the tone arm 15 is controlled in such a manner that the period of time required for performing the operations of steps from 93 to 96 is shorter than the interval between two consecutive output coded signals from the arm angle encoder 21. Accordingly, a high accuracy in the lead-in part detection is obtained.

Refering back to FIG. 10, in steps similar to the steps 92~97 explained with respect to the step 86 in conjunction with FIG. 11, the address values of the unrecorded separation bands of the record disc are sequentially stored in the memory device of the control device 20 at the step 88. In the step 88, the address values corresponding to the peak of the stored past value are sequentially stored in the memory device of the control device 20. At the same time, the information of the rotation angle of the turntable 12 supplied to the control device from the motor control circuit 21 is also stored in correspondence with the address of the above described peak value.

In the following step 89, the programed information as to the pieces of music is read out. The correction of address value corresponding regions of non-recording (lead-in part or separation bands) just before the recorded region of the music piece to be reproduced is performed with utilizing the signal produced by the stylus position correction signal producing circuit 24 and converted by the A/D converter 27. The motors 17 and 18 are supplied with the driving electric power by the tone arm control circuit 19, whereby the tone arm 15 is lifted and thereafter rotated horizontally towards inner periphery of the record disc until the corrected address value coincides with the address value of the address signal from the encoder 21. When the tone arm 15 reaches the above address position, the horizontal rotation of the tone arm 15 is stopped and then the tone arm 15 is lowered by the vertical drive motor 18. in the step 89, the information of rotation angle of the turntable 12 stored at the step 88 is read out. So as to coincide the time point when the stylus contacts the record disc with the time point of the rotation angle of the above described information of the rotation angle, a necessary waiting time is provided in the result that lowering start time is calculated with a lowering necessary time of the stylus and rotation period time of the turntable. If the record disc has an eccentricity, the stylus contacts precisely the predetermined position on the record disc surface. The above described switch-on and off operations of the muting switch 31 is performed in the step 89.

In the step 90, after the stylus 14 contacts the record disc, the vertical drive motor 18 is supplied with a driving current to cause the tone arm 15 to lower. After the stylus 14 contacts the record disc, the driving current to be supplied to the vertical drive motor 18 is abruptly increased. Utilizing this phonomenon, when the magnitude of the driving current for the vertical drive motor 18 exceeds the predetermined value, a signal is produced and then supplied to the control device 20. The control device 20 supplies the control signal to the tone arm control circuit whereby the driving current to be supplied to the vertical drive motor 18 is decreased.

The vertical drive motor 18 is supplied with the predetermined constant current so that the stylus contact the record disc surface with the predetermined stylus pressure. Accordingly, in order that the stylus contacts the record disc surface with the predetermined stylus pressure while the stylus traces a sound groove of the record dis, the voltage from the stylus pressure adjusting signal generating circuit 25 is amplified at the amplifier 26 and then supplied to the vertical drive motor 18. On the other hand, the output of the stylus pressure adjusting signal generating circuit 25 is supplied to the A/D converter 27 through the switch 23 where it is converted into a digital signal. This digital signal is supplied to the decoder of the control device 20 where it is decoded and thereafter supplied to the indicator 30 to indicate the stylus pressure. The indicator 30 indicates the music piece number which is played at present, the music piece number to be played next, and the number of the remaining programed music pieces.

The control device 20 reads the information out from the table of the ROM in accordance with the address signal from the encoder 21 and forms a signal to be supplied to the D/A converter 32. The D/A converter 32 attenuates the rotational angular velocity signal from the phase shifter 33 in accordance with the signal from the control device 20. The output signal of the D/A converter 32 is supplied to the servo circuit 35 through the low-pass filter 34, whereby the rotation of the turntable 12 is controlled to correct the influence of the eccentricity of the record disc 11.

The control device 20 compares the output signal of the encoder 21 and the address signal corresponding to the position of the unrecorded separation bands stored upon programing, and detects that both signals coincide each other or the former signal exceeds the latter signal. The control device 20 then supplies the control signal to the tone arm control circuit 19, whereby the tone arm 15 is rotated upwardly. In the above described comparison, in a case where the address values of both signals have not coincided, the operation of the apparatus returns to the stylus pressure indication operation, whereby the comparing of addresses is repeated. As similarly in the step 88, this comparison is performed when the rotation angle of the turntable coincides with the stored value, whereby the occurrence of erros due to eccentricity of the record disc is prevented.

In a case where a step 91 judges the fact that, the programed music pieces are remaining after the tone arm 15 is lifted, the operation returns to the step 89 and operations after the step 89 are performed. On the other hand, in a case where the step 91 judges the fact that no programed music piece is remained, the operation proceeds to the step 84 whereby rejection operation is performed.

Further, this invention is not limited to these embodiments but various variations and modifications may be made without departing from the scope of the invention.

What we claim is:
1. A record disc playing apparatus comprising:
(a) a tone arm having a reproducing stylus for tracing a sound groove of a record disc said tone arm being mounted for rotation on a shaft;
(b) digital address signal generating means comprising address means bearing a plurality of digital addresses and address reader means disposed in facing relationship to said address means and configured to selectively read one of the digital addresses, the selection of such an address to be read depending on the relative angular position of said reader means with respect to said address means, one of said address means or said reader means being mechanically coupled to the shaft of said tone arm, so that said digital address signal generating means produces as an output a set of unique digital address signals, each such address signal corresponding to a unique horizontal rotational angular position of said tone arm;
(c) means for generating a rotational angular velocity signal which is independent of said digital address signal generating means, said rotational angular velocity signal corresponding to the horizontal rotational angular velocity of the tone arm independent of the angular positions of the tone arm, said rotational angular velocity signal corresponding to the quantity of any eccentricity of said record disc;

(d) means for controlling the rotation of a motor driving a turntable on which the record disc is mounted;

(e) a control device supplied with said digital address signals and having a memory device from which is read out information corresponding to the desired attenuation quantities indicated by said digital address signals, said control device producing output signals based on said information thus read out;

(f) attenuation means supplied with said rotational angular velocity signal and operating with an attenuation quantity, with respect to said rotational angular velocity signal, which quantity is varied by a signal from said control device; and (g) said attenuation means supplying an output signal to said means for controlling the rotation of a motor, the rotation of said motor being so controlled that a rotational irregularity due to any eccentricity of said record disc is corrected for.

2. A record disc playing apparatus as claimed in claim 1 in which said attenuation means is a digital-to-analog-converter.

3. A record disc playing apparatus as claimed in claim 1 which further comprises:

a horizontal drive motor for imparting a horizontal rotational force to the tone arm, said horizontal drive motor being provided with means of electromagnetic type for generating said rotational angular velocity signal;

a phase shifter for phase-shifting the rotational angular velocity signal by 90°; and a smoothing circuit for smoothing the output of the attenuation means.

4. A record disc playing apparatus as claimed in claim 1 in which:

said horizontal drive motor comprises a permanent magnet rotatable unitarily with the tone arm, and a flat drive coil provided to confront the permanent magnet and to be supplied with a driving current;

and said rotational angular velocity signal means comprises a flat generating detecting coil provided to confront the permanent magnet, a signal current corresponding to the rotational angular velocity being derived from the detecting coil.

5. A record disc playing apparatus as claimed in claim 1 in which the rotational speed of the motor for driving the turntable is controlled to follow the relation $$\frac{1}{1 + \frac{D}{L_2}\cos\theta_1}$$

where D denotes quantity of eccentricity of the record disc, $L_2$ denotes a distance between the position of the reproducing stylus tip and the center of the record disc, and $\theta_1$ denotes a rotational angle of the tone arm, where the signal corresponding to the quantity $D\cos\theta_1$, is generated by means independent of those for generating the signal corresponding to the quantity $L_2$ where the signal corresponding to the quantity $L_2$ is generated from tables of data corresponding to said digital address signals and the transmission gain characteristic of said attenuation means.

6. A record disc playing apparatus comprising:

(a) a tone arm having a reproducing stylus for tracing a sound groove of a record disc said tone arm being mounted for rotation on a shaft;

(b) digital address signal generating means comprising address means bearing a plurality of digital addresses, and address reader means disposed in facing relationship to said address means and configured to selectively read one of the digital addresses, the selection of such an address to be read depending on the relative angular position of said reader means with respect to said address means, one of said address means or said reader means being mechanically coupled to the shaft of said tone arm, so that said digital address signal generating means produces as an output a set of unique digital address signals, each such address signal corresponding to a unique horizontal rotational angular position of said tone arm;

(c) means for generating a rotational angular velocity signal which is independent of said digital address signal generating means, said rotational angular velocity signal corresponding to the horizontal rotational angular velocity of the tone arm independent of the angular positions of the tone arm, said rotational angular velocity signal corresponding to the quantity of any eccentricity of said record disc;

(d) means for controlling the rotation of a motor driving a turntable on which the record disc is mounted;

(e) a control device supplied with said address signals and information with respect to a nominal rotation speed of the record disc, said device having a memory device from which is read out data corresponding to the desired attenuation quantities indicated by said digital address signals, said control device producing output signals based on said data and said information thus read out;

(f) attenuation means supplied with said rotational angular velocity signal and operating with an attenuation quantity, with respect to said rotational angular velocity signal, which quantity is varied by a signal from said control device;

(g) said attenuation means supplying an output signal to said means for controlling the rotation of a motor, the rotation of said motor being so controlled that a rotational irregularity due to any eccentricity of said record disc is corrected for.

* * * * *